United States Patent [19]

Kemper

[11] 4,235,127
[45] Nov. 25, 1980

[54] TRACTION SURFACE COOLING SYSTEM FOR TORQUE TRANSMISSIONS

[75] Inventor: Yves J. Kemper, Birmingham, Mich.

[73] Assignee: Vadetec Corporation, Troy, Mich.

[21] Appl. No.: 23,399

[22] Filed: Mar. 23, 1979

Related U.S. Application Data

[63] Continuation-in-part of Ser. No. 6,899, Jan. 26, 1979, abandoned.

[51] Int. Cl.³ .............................................. F16H 57/04
[52] U.S. Cl. ......................................... 74/796; 74/467
[58] Field of Search ................. 74/796, 199, 214, 467; 184/104 R, 104 B; 415/72; 165/94, 95

[56] References Cited

U.S. PATENT DOCUMENTS

| | | | |
|---|---|---|---|
| 1,971,781 | 8/1934 | Henderson et al. | 74/467 |
| 2,966,381 | 12/1960 | Menzel | 415/72 |
| 2,982,145 | 5/1961 | Orner | 74/467 X |
| 3,347,106 | 10/1967 | Flichy | 74/199 |
| 3,677,109 | 7/1972 | Stuemky | 74/796 |

*Primary Examiner*—Peter P. Nerbun
*Attorney, Agent, or Firm*—Robert F. Ziems

[57] ABSTRACT

A traction drive torque transmission having a lubricant recirculating system by which a liquid lubricant is passed into and out of heat transfer contact with frictionally engaged rolling surfaces and in which transfer of thermal energy from the rolling surfaces to the lubricant is enhanced by removing a boundary layer of the lubricant which forms on the surfaces. Blade-like scrapers or wipers are mounted on a transmission component movable relative to the frictionally engaged rolling surfaces and are located in relation to ports through which lubricant is passed to the surfaces so that a supply of fresh and relatively cool lubricant is available at the surfaces as they are wiped.

12 Claims, 8 Drawing Figures

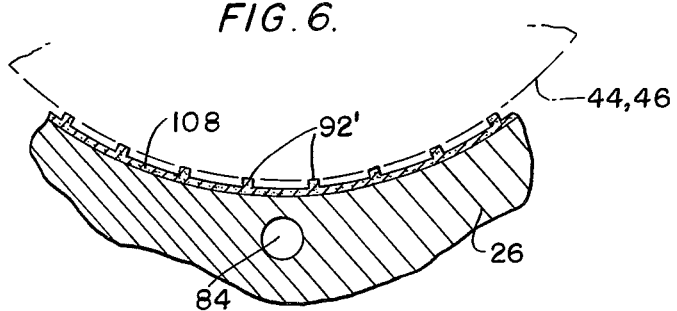
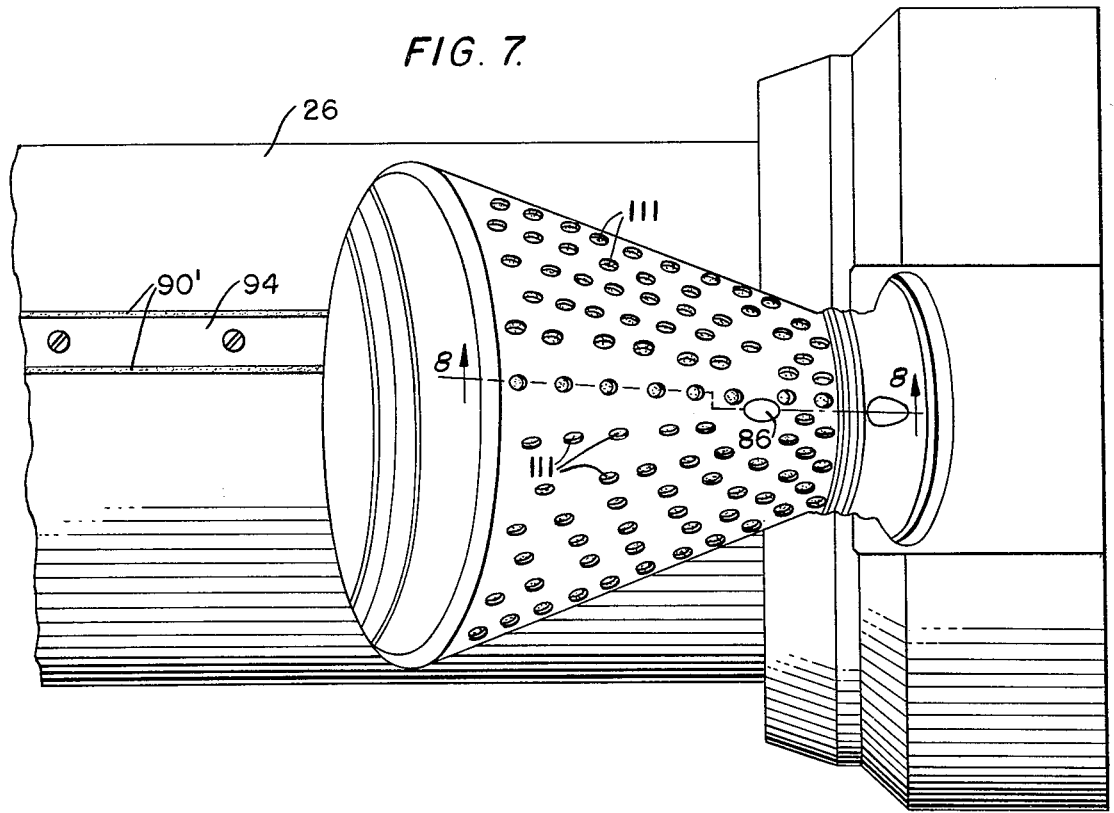
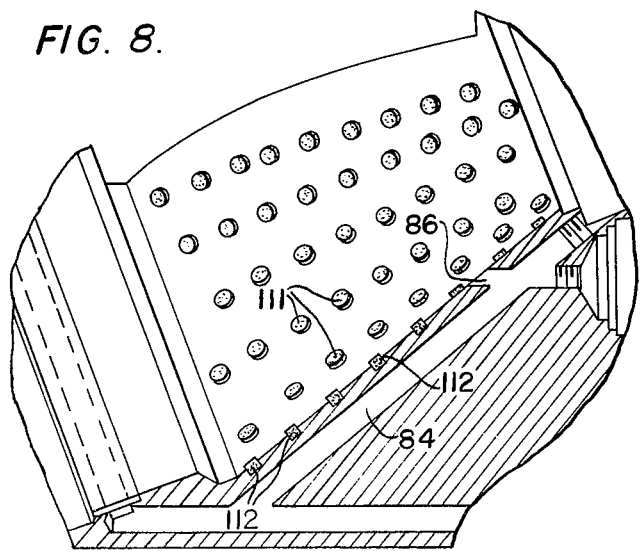

TRACTION SURFACE COOLING SYSTEM FOR TORQUE TRANSMISSIONS

CROSS-REFERENCE TO RELATED APPLICATION

This is a continuation-in-part of copending U.S. application Ser. No. 6,899, filed Jan. 26, 1979, now abandoned by Yves Jean Kemper, entitled "TRACTION SURFACE COOLING SYSTEM FOR TORQUE TRANSMISSIONS" and assigned to the assignee of the present invention.

BACKGROUND OF THE INVENTION

This invention relates to traction drive torque transmissions and, more particularly, it concerns improvements in traction surface cooling apparatus for such transmissions.

In traction drive transmissions, torque is transmitted by rolling friction between one or more pairs of traction surfaces on components arranged to be retained against one another in a manner to develop normal forces adequate to prevent slippage between the surfaces. Such transmissions are particularly useful in the transmission of power at continuously or infinitely variable speed ratios because of the facility offered by the smooth rolling surfaces of each traction surface pair for an infinitely variable radius ratio. Examples of such infinitely variable transmissions are disclosed in U.S. Pat. Nos. Re. 29,328, reissued Aug. 2, 1977, No. 4,112,779 and 4,112,780, both issued Sept. 12, 1978, and U.S. Application Ser. No. 706,291, filed July 19, 1976, now Pat. No. 4,152,946 all of which are owned by the assignee of the present invention.

Though seemingly inconsistent with transmission of torque by friction, the rolling or traction surfaces of the transmission exemplified by the disclosures of the aforementioned patents and application are lubricated and cooled by circulating a liquid lubricant through the transmission housing. Torque transfer is, in actuality, by viscous shear of a very thin film of lubricant between the traction surfaces which are of smooth tool steel. The lubricants used are synthetic oils developed specifically for traction drives and increase in viscosity under the pressures existing between the traction surfaces to a point of becoming almost glassy in character. Accordingly, high coefficients of traction are possible without abnormal deterioration of the contacting surfaces.

As indicated, the liquid lubricant functions also as a heat storage medium by which the heat developed at the traction surfaces is transferred to the exterior of the transmission housing by recirculation and cooling of the lubricant. Partially because of the relative motion between the traction surfaces and the recirculated lubricant, and also in part because of the viscosities reached by the lubricant, a boundary layer of lubricant tends to build on the surfaces to a point where the torque transmitting efficiencies of the lubricant is reduced and more critically, the transfer of heat to the recirculated lubricant is impeded. These problems created by the boundary layer of lubricant are, moreover, dichotomous in the sense that the reduction of torque transmitting efficiency can be avoided by circulating less lubricant over the surfaces whereas the removal of heat developed by the stresses imposed on the traction surfaces requires large quantities of the lubricant to be circulated over the same surfaces. Hence, the solution of these problems in the past have involved a trade-off or compromise between rated power transmission capacity and useful life of a particular transmission unit.

SUMMARY OF THE INVENTION

In accordance with the present invention, the removal of thermal energy or heat from the rolling friction surfaces of traction drive transmissions by recirculation of a liquid lubricant is enhanced without reduction in viscous film torque transmitting efficiency by mechanically wiping or scraping the traction surfaces to eliminate the boundary layer of lubricant on the surfaces. This operation is achieved very simply by providing wipers on a component which moves relative to the engaging surfaces of the respective traction surface pairs. The wipers are either elongated to be effective over the complete axial extent of the traction surfaces or in the form of a pattern of discrete wiping zones extending over a substantial portion of the traction surface area. Further, the wipers are preferably located in relation to porting or conduit openings through which the lubricant is passed to the traction surfaces so that localized heat developing at the points of traction surface engagement will pass immediately to freshly supplied lubricant and carried thereby to the exterior of the transmission.

Accordingly, among the objects of the present invention are: the provision of an improved cooling apparatus for traction drive torque transmissions; the provision of such a cooling apparatus which is very simply accommodated in an existing transmission design; and the provision of such a cooling system by which the deleterious effects of a boundary layer of lubricant are avoided to increase the transfer of heat from lubricant carrying traction surfaces to a liquid lubricant recirculated through the transmission without affecting the rheological characteristics of the lubricant needed to transmit torque by viscous shear.

Other objects and further scope of applicability of the present invention will become apparent from the detailed description to follow taken in conjunction with the accompanying drawings.

BRIEF DESCRIPTION OF THE DRAWINGS

FIG. 6 is a fragmentary cross-section on line 6—6 of FIG. 5;

FIG. 7 is a plan view like FIG. 4 but illustrating another alternative embodiment; and FIG. 8 is a fragmentary cross-section on line 8—8 of FIG. 7.

DETAILED DESCRIPTION OF THE PREFERRED EMBODIMENTS

Figure 1:
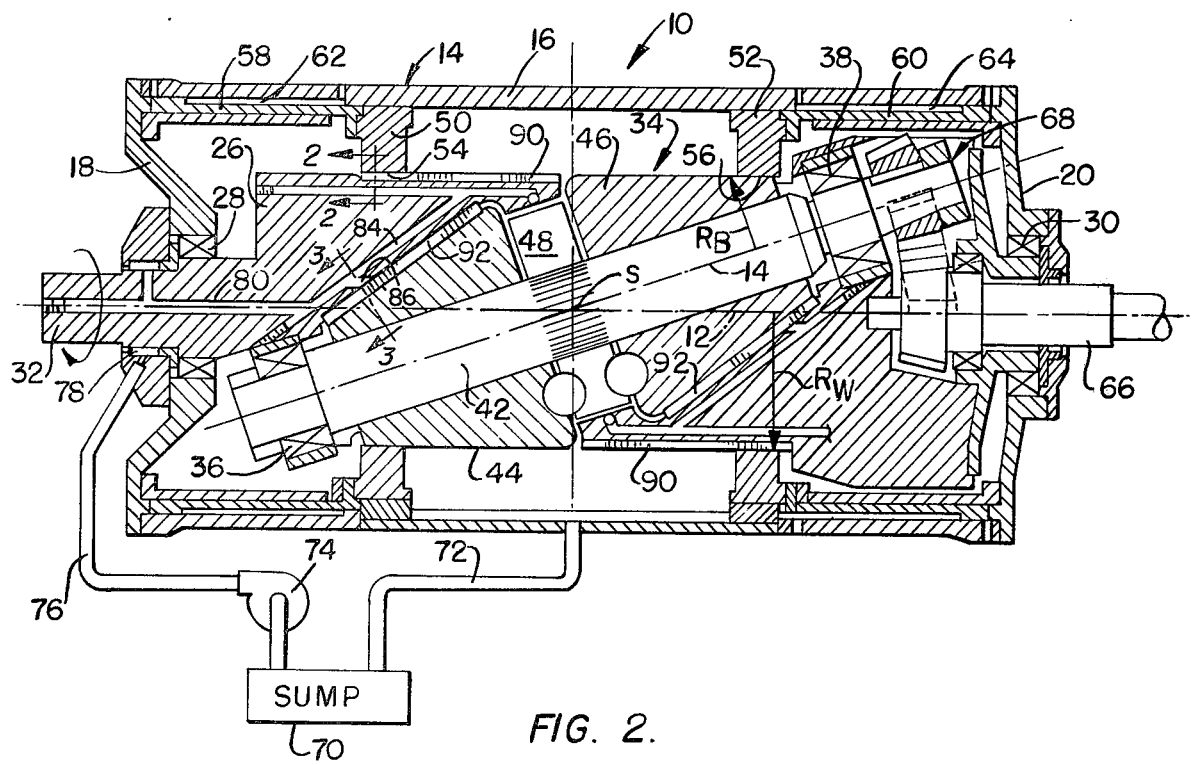
FIG. 1 is a longitudinal cross-section illustration of a transmission incorporating the invention.

In FIG. 1 of the drawings, an exemplary embodiment of an infinitely variable traction drive transmission incorporating the present invention is shown in longitudinal cross section and designated generally by the reference numeral 10. Although the structure and operation of the transmission is fully described in the aforementioned U.S. Patents and Application, a summary description of the transmission 10 will facilitate a complete understanding of the present invention.

The plane of the cross-section in FIG. 1 includes a first or primary transmission axis 12 and a second or nutational axis 14 inclined with respect to the axis 12 and intersecting same at a point S of axes intersection. The orientation of the first axis 12 is established by a fixed frame 14 in the form of a cylindrical housing 16 closed at opposite ends by journalled end sections 18 and 20. Components located within the housing 16 include a crank-like alpha body 26 supported by bearings 28 and 30 in the frame end sections 18 and 20 for rotation about the primary or first axis 12. An input shaft 32 is connected directly to the alpha body 26 and is thus concentric with the axis 12. A nutatable beta body, generally designated by the reference numeral 34, is supported by bearings 36 and 38 in the alpha body 26 for rotation about the second axis 14. In the disclosed embodiment, the beta body 34 includes a central supporting shaft 42 on which a pair of oppositely convergent conical members 44 and 46 are supported for some measure of both axial and rotational movement relative to the shaft 42. A ball/ramp unit 48 is slidably keyed or splined on the shaft 42 between the cone members 44 and 46. While the unit 48 is fully disclosed in a commonly assigned copending U.S. Application Ser. No. 926,823, filed July 21, 1978, now abandoned, by Harvey N. Pouliot, to which reference may be made for structural detail, for a complete understanding of the present invention, it is necessary only to appreciate that the unit 48 functions to bias the cone members in opposite directions away from the point S in response to a torque differential between the shaft 42 and the cone members 44 and 46 and to couple the cone members rotatably with the shaft. It will be noted also that the conical surfaces of the members 44 and 46, also referred to herein as beta traction surfaces, are concentric with the second axis 14 and are of a variable radius $R_b$ with respect to that axis.

The axial bias of the cone members 44 and 46 by the ball/ramp unit 48 along the shaft 42, coupled with the angular relationship of the axis 14 as well as the configuration of the conical members, causes the conical beta surfaces on the members 44 and 46 to be urged into engagement with a pair of axially adjustable omega rings 50 and 52 defining interior omega rolling or traction surfaces 54 and 56 which are of revolution about the primary axis 12 and of a constant radius $R_w$. The rings 50 and 52 are secured against rotation in the frame section 16 and are fixed at the inner ends of annular piston members 58 and 60 operably positioned respectively in annular chambers 62 and 64. The chambers 62 and 64 are ported to hydraulic fluid conduits (not shown) in such a manner that pressurized control fluid in the chambers 62 and 64 will cause the pistons and thus the rings 50 and 52 to move along the axis 12 toward or away from the point S of axes intersection.

In the operation of the transmission 10 to transmit torque originating at the input shaft 32, the alpha body 26 is rotated directly with the input shaft 32 causing the second axis 14 and thus the beta body 34 to nutate about the first axis 12 with the beta traction surfaces on the exterior of the cone members 44 and 46 in contact on opposite sides of the primary axis 12 with the omega traction surfaces 54 and 56 on the rings 50 and 52. The shaft 42, rotatable with the cone members 44 and 46 on the second axis 14 is coupled or linked to an output shaft 66 by an epicyclic gear set 68. Thus it will be seen that torque at the output shaft 66 will be the result of input torque driving the alpha body 26 in rotation about the first axis to cause planetary movement in the gear set 68 together with torque transmitted by friction between the omega surfaces 54 and 56 and the beta surfaces on the cone members 44 and 46 to cause rotation of the beta body 34 and the shaft 42 about the second axis 14. Further, the ball/ramp system 48 urges the cone members 44 into engagement with the omega rings 50 and 52 to develop a normal force proportional to torque transmitted by the shaft 42.

To lubricate and to cool the operating components of the transmission 10, a liquid lubricant is circulated from an external storage source such as a sump 70 to the interior of the housing 16 and returned to the sump by a gravity flow line 72. The lubricant is fed to the transmission by a pump 74 through a conduit 76 to a sealed gland or manifold 78 in the end frame 18 adjacent the bearing 28. The shaft 32 is internally bored to provide a lubricant passageway 80 which communicates with branch passages 84 in the alpha body 26. These latter passages communicate directly with discharge ports 86 in the body 26 as may be understood by reference to FIGS. 1 and 3.

Figure 2:
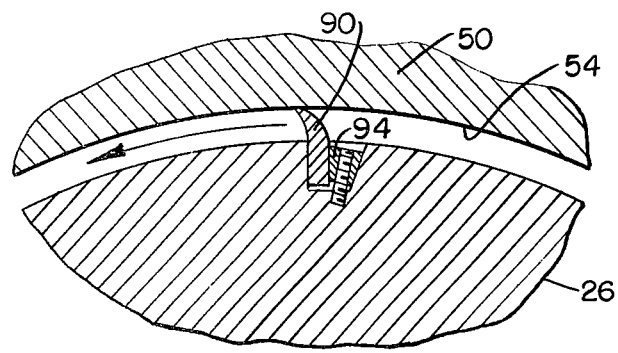
FIG. 2 is an enlarged fragmentary cross-section on line 2—2 of FIG. 1.
Figure 3:
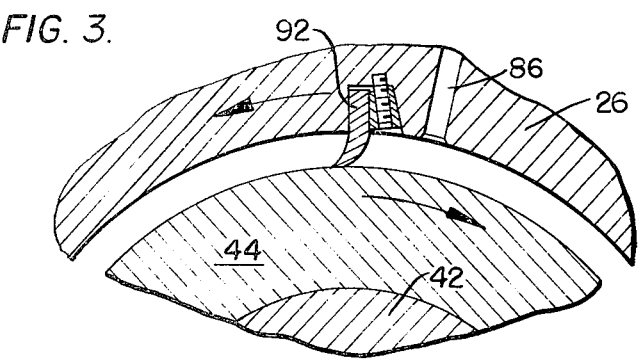
FIG. 3 is an enlarged fragmentary cross-section on line 3—3 of FIG. 1.

In the embodiment of FIGS. 1-3, the alpha body 26 carries two sets of elongated blade-like scrapers 90 and 92, respectively. As shown in FIG. 1, the blades 90 are positioned to engage the omega traction surfaces 54 diametrically opposite from the point at which these surfaces are engaged by the beta traction surfaces on the conical members 44 and 46. These blades are elongated so that they will engage the surfaces 54 and 56 throughout axial movement of the rings 50 and 52 in the operation of the transmission 10 to vary the speed ratio thereof. As shown in FIG. 2, the blades 90 project from the surface of the alpha body 26 in a manner effective to scrape the traction surfaces 54 as a result of the direction of rotation of the alpha body 26. Though illustrated in FIG. 2 to have a tapered or knife-like edge, the blades may be of a variety of specific configuration appropriately secured to the body 26 such as by clamping wedges 94. Also, the material from which the blades are formed may include synthetic resinous materials or may be metallic.

Because of the relative rotation of the respective transmission bodies 26 and 34, the blades 92, which are identical in construction to the blades 90, project inwardly from the alpha body 26 in a manner to effectively remove lubricant from the surfaces of the members 44 and 46 as a result of relative rotation between the bodies 26 and 34. The blades 92 also extend in length through at least the axial distance of contact between the omega and beta surfaces.

Although the precise location of the blades 92 on the alpha body 26 is not critical, it will be noted that the oil discharge ports 86 from which oil is directed against the surfaces of the beta cone members 44 and 46 are positioned behind the blades 92 in terms of alpha-beta body rotation. As a result, residual lubricant on the surfaces of the cones, including lubricant resulting from a boundary layer phenomenon will be removed from these surfaces in advance of the application of newly recirculated lubricant from the ports 86. In this way the heat transfer from the surfaces 54 and 56 to the lubricant will be enhanced.

In the operation of the transmission 10, relatively cool lubricant will be pumped from the sump 70 through the passageways 80 and 84 in the alpha body 26 and be discharged through the ports 86 directly against the beta traction surfaces on the exterior of the cone members 44 and 46. Though not shown in the drawings, it is contemplated that the lubricant may be cooled by an appropriate heat exchanger associated with the sump 70 or with the passages 72 or 76 on the exterior of the transmission 10. Because of the location of the ports 86 relative to the blades 92, the fresh, cooled lubricant will engage the beta surfaces immediately after they have been wiped clean of any residual lubricant, thereby to enhance the passage of heat from the cone members 44 and 46 to the freshly supplied lubricant. The major portion of the lubricant will pass outwardly by centrifugal force to the omega rings 50 and 52 and other components inside the housing 16 from which it will pass back to the sump through the line 72. Although no direct porting is provided by which fresh lubricant is passed directly to the omega traction surfaces 54 and 56, the location of these rings about the exterior of the alpha body 26 and the beta body 34 enables a supply of lubricant to pass to these surfaces adequate to maintain lubrication of these surfaces as needed for the provention of wear or deterioration of the surfaces 54 and 56. Cooling of the surfaces 54 ad 56 will occur as a result of heat transfer from the surfaces 54 and 56 to the conical surfaces on the members 44 and 46 as well as by heat transfer to the lubricant recirculated to the sump 70. In this latter respect, although the temperature of the lubricant on reaching the rings 50 and 52 may be higher than it is at the surfaces on the cones 44 and 46, the removal of residual lubricant from the surfaces 54 and 56 by the blades 90 coupled with the relatively large ratio of total ring surface area to the area of working or traction surfaces 54 and 56 will prevent any excessive heat build up in the rings 50 and 52.

Figure 4:
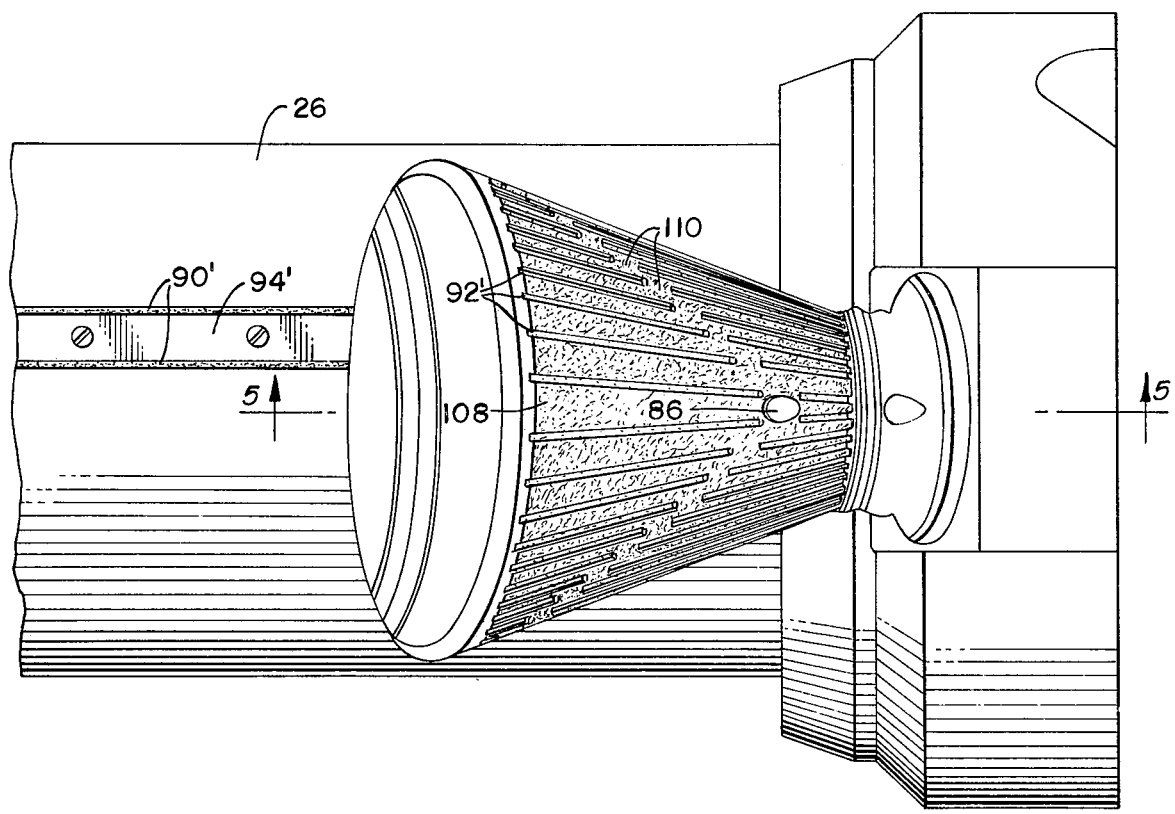
FIG. 4 is a plan view of a transmission component incorporating an alternative embodiment of the invention.
Figure 5:
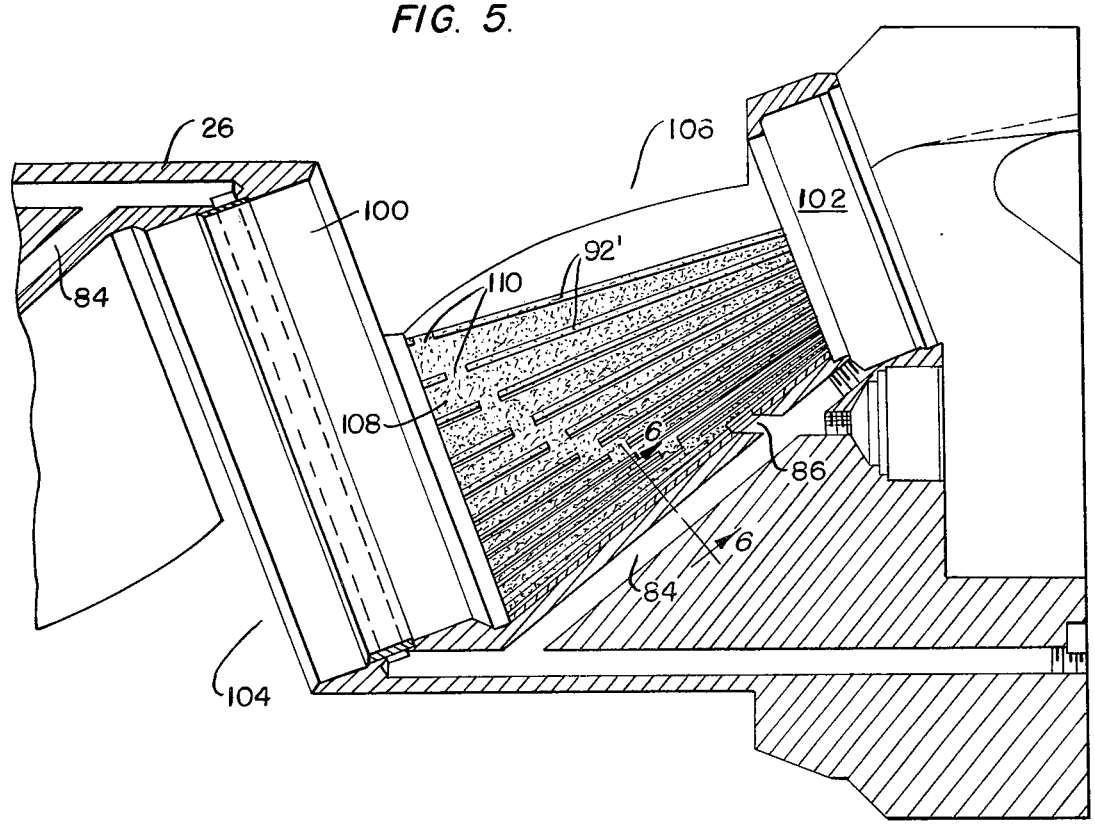
FIG. 5 is a cross-section on line 5—5 of FIG. 4.

In FIGS. 4–6 of the drawings, an alternative embodiment of the invention is shown in which parts identical with those of FIGS. 1–3 are designated by the same reference numeral whereas parts having the same function but modified in structure are designated by the same reference numerals primed. Thus, in FIGS. 4 and 5 the alpha body 26 is shown by itself and in somewhat more detail than in FIG. 1. It will be seen more clearly in these figures, for example, that the body 26 is an integral or unitary member having a pair of symmetrical frusto-conical cavities 96 and 98 extending between a central cylindrical portion 100 to counterbores 102 in which the bearings 36 and 38 (see FIG. 1) are seated. The cavities 96 and 98 complement the exterior shape of the cone members 44 and 46 in a manner such that the cavity delimiting surfaces are normally spaced out of contact with the cone members. The cavities 96 are also sectors in the sense that they open at diametrically opposite windows 104 and 106 through which the cone members 44 and 46 contact the traction surfaces 54 and 56 on the omega rings 50 and 52. The arrangement of lubricant passages 84 and ports 86 is the same in FIGS. 4–6 as that of FIG. 1.

In the embodiment of FIGS. 4–6, a single wiper blade assembly 90' is again positioned on the exterior of the alpha body 26 to wipingly engage the traction surfaces 54 and 56. In this instance, the blades 90' are defined by spaced edges of flexible material retained by a central bar 94' is essentially the same manner as the blades 90 of the embodiment of FIGS. 1–3. In place of the single blades 92, however, a plurality of blade-like portions 92' are employed in this embodiment. As shown most clearly in FIGS. 5 and 6, the multiple blades 92' extend longitudinally to be effective over the full length of each of the cone members 44 and 46 and are provided as integral formations on a sheet-like molding 108 of a shape to conform with the frusto-conical configuration of the cavities 96 and 98. The sheet-like molding 108 may be secured by an appropriate adhesive or bonded within the cavities in the position illustrated.

To insure a complete distribution of lubricant between the blade portions 92' and thus against the exterior of the cone members 44 and 46, the blades 92' are interrupted along their respective lengths to establish lubricant passing openings or gaps 110. The openings 110 are preferably staggered or offset from each other axially in order that the wiping function of the blade portions 92' will be effective throughout the working length of the cone members 44 and 46.

In light of the provision of multiple blade portions 92' in the embodiment of FIGS. 4–6, a more complete removal of residual lubricant remaining on the cone members 44 and 46 will be effected. On the other hand, a complete distribution of fresh and cool lubricant over a substantial portion of the cone surfaces will enhance the removal of heat from and thus cool the working traction surfaces on the conical members 44 and 46.

In FIGS. 7 and 8, a still further embodiment of the invention is illustrated. In this embodiment, the function of the blades 92 and 92' of the previous embodiments is served by a plurality of discrete wiping plugs 111 arranged within the frusto-conical cavities of the alpha body 26 to be in a staggered again effective over the entire length of the conical surfaces on the members 44 and 46. As shown most clearly in FIG. 8, the wiping elements 110 are in the nature of plugs of felt-like material individually receivable in relatively shallow holes 112 bored into the surfaces of the cavities 96 and 98. The pattern of the plugs will in itself assure uniform distribution of fresh or cool lubricant fully over the surfaces of the cone members 44 and 46.

Thus it will be seen that as a result of the present invention, a highly effective apparatus is provided for cooling the frictionally engaged rolling surfaces of traction drive transmissions and by which the above-mentioned objectives are completely fulfilled. Also it will be appreciated that modifications may be made in the embodiments disclosed without departure from the invention concepts manifested by such embodiments. It is expressly intended, therefore, that the foregoing description is illustrative of a preferred embodiment, not limiting, and that the true spirit and scope of the present invention be determined by reference to the appended claims.

I claim:

1. In a traction drive torque transmission having at least two traction surfaces in rolling frictional engagement with each other under normal force loading, a rotatable body movable relative to both such surfaces and a lubricant circulating system by which a liquid lubricant is delivered to and collected from the traction surfaces, the improvement comprising:

traction surface engaging means for removing lubricant from each of the traction surfaces during operation of the transmission; and means to support said traction surface engaging means from the rotatable body so that said engaging means will be in continuous contact and movable relative to the traction surfaces;

said traction surface engaging means being operative to remove lubricant from the traction surfaces thereby to increase the heat transfer from said traction surfaces to the lubricant.

2. The apparatus recited in claim 1, wherein said traction surface engaging means comprises elongated blade-like members.

3. The apparatus recited in claim 2, wherein said blade-like members are of a length to be effective over the complete axial distance of frictional engagement between the traction surfaces.

4. The apparatus recited in either of claims 1, 2 or 3, including lubricant discharge port means in the rotatable body to direct lubricant against at least one of the traction surfaces immediately after the removal of lubricant therefrom.

5. The apparatus recited in either of claims 2 or 3, wherein said blade-like members are defined as rib formations on a sheet-like molding secured to the rotatable body.

6. The apparatus recited in claim 5, including a plurality of said rib formations and wherein each of said rib formations is interrupted along the length thereof to provide a lubricant passage through each rib formation.

7. The apparatus recited in claim 1, wherein said traction surface engaging means comprises a staggered pattern of discrete wiping pads supported by the rotatable body.

8. In a traction drive torque transmission having a frame defined by a close housing, an alpha body supported by said frame for rotation about a first axis, a beta body supported for relative rotation from said alpha body on a second axis inclined with respect to and intersecting said first axis at a point of axes intersection, said beta body defining a pair of traction surfaces of revolution about said second axis, one on each side of said point of axes intersection, means defining a pair of omega traction surfaces of revolution about said first axis, one on each side of said point of axes intersection and means for forcing said beta and omega surfaces into rolling frictional engagement with each other at two points diametrically opposite from each other with respect to the said first axis, and means for circulating a liquid lubricant into said housing against said beta and omega surfaces and out of said housing, the improvement comprising wiping means supported by said alpha body for engagement with each of said omega and beta surfaces and operative to remove lubricant from said traction surfaces thereby to increase the rate of heat transfer from said surfaces to the lubricant.

9. The apparatus recited in claim 8, in which the traction surfaces on the beta body are external surfaces of revolution nested in complementary cavities defined by surfaces in the alpha body spaced from the beta body traction surfaces and wherein said wiping means comprises a sheetlike molding secured against the cavity defining surfaces, said molding having a plurality of angularly spaced, longitudinally extending and projecting rib formations to engage and wipe the traction surfaces of the beta body.

10. The apparatus recited in claim 9, wherein each of said rib formations is interrupted along the length thereof to provide lubricant passages by which lubricant may pass in direct contact with the area of the beta body traction surfaces within said cavities.

11. The apparatus recited in claim 8, in which the traction surfaces on the beta body are external surfaces of revolution nested in complementary cavities defined by surfaces in the alpha body spaced from the beta traction surfaces and wherein said wiping means comprises a plurality of discrete wiping pads in said cavity defining surfaces, said wiping pads being arranged in a staggered pattern and operative to engage and wipe traction surfaces on the beta body.

12. The apparatus recited in either of claims 9 or 11, including means defining a single lubricant port in the alpha body opening through each of said cavity defining surfaces to direct lubricant against the respective traction surfaces of the beta body.

* * * * *